United States Patent [19]

Bateman

[11] 4,235,980
[45] Nov. 25, 1980

[54] ELASTOMERIC TERIONOMER BLENDS

[75] Inventor: Linda R. Bateman, Wilmington, Del.

[73] Assignee: E. I. Du Pont de Nemours and Company, Wilmington, Del.

[21] Appl. No.: 87,465

[22] Filed: Oct. 19, 1979

[51] Int. Cl.$^2$ ............................................. C08L 33/02
[52] U.S. Cl. .................................... 525/215; 525/196; 525/221
[58] Field of Search ....................... 525/215, 221, 196

[56] References Cited

U.S. PATENT DOCUMENTS

| | | | |
|---|---|---|---|
| 3,384,612 | 5/1968 | Brandt et al. | 260/41 |
| 3,454,676 | 7/1969 | Busse | 525/221 |
| 3,969,434 | 7/1976 | Powell et al. | 525/196 |

Primary Examiner—Carman J. Seccuro

[57] ABSTRACT

Elastomeric terionomer blends composed of (1) a copolymer of chloroprene with an $\alpha,\beta$-unsaturated carboxylic acid, (2) a copolymer of ethylene with an $\alpha,\beta$-unsaturated carboxylic acid, and (3) a terpolymer of ethylene with a vinyl ester of a lower saturated carboxylic acid or with a lower alkyl acrylate or methacrylate and with an $\alpha,\beta$-unsaturated carboxylic acid, which blends are neutralized with metal ions to a degree of at least 10%, are easily processable in conventional rubber-processing equipment, can be extruded and injection-molded, and have very good physical properties and low flammability.

8 Claims, No Drawings

ELASTOMERIC TERIONOMER BLENDS

BACKGROUND OF THE INVENTION

This invention relates to certain thermoplastic elastomer compositions comprising three different types of polymeric materials, such compositions being characterized by very good processability, high tensile strength, good oil and ozone resistance, and low flammability.

It is well known to blend polymeric materials to products having desirable properties. In order to achieve good blending to a homogeneous product, it is necessary to select starting materials that are compatible with one another, that is, can be dispersed in one another without separating into distinct phases. Such homogeneous blends usually can be processed in ordinary equipment as easily as their individual components. However, in rare cases, polymeric materials that can be readily processed by themselves and that are compatible with one another do not form blends that can be processed as readily.

For example, a copolymer of chloroprene with an $\alpha,\beta$-unsaturated carboxylic acid such as methacrylic acid has excellent elasticity, tensile strength, and light and ozone resistance. Copolymers of ethylene with $\alpha,\beta$-unsaturated carboxylic acids can be crosslinked with certain metal ions to tough resins. Each of these can be fabricated in conventional extruding or injection-molding equipment. However, when they are blended with each other, the resulting blend, although homogeneous, is not readily processable and cannot be extruded or injection-molded.

It is, therefore, desirable to provide readily processable blends of copolymers of chloroprene with $\alpha,\beta$-unsaturated carboxylic acids with copolymers of ethylene with $\alpha,\beta$-unsaturated carboxylic acids.

SUMMARY OF THE INVENTION

According to this invention, there is now provided an elastomeric blend consisting essentially of about:

(1) 20–80 weight percent of a copolymer of chloroprene with an $\alpha,\beta$-unsaturated $C_3$–$C_{10}$ carboxylic acid, (2) 10–50 weight percent of a copolymer of ethylene with an $\alpha,\beta$-unsaturated $C_3$–$C_{10}$ carboxylic acid, and (3) 10–50 weight percent of a terpolymer of ethylene with a vinyl ester of a $C_1$–$C_6$ saturated aliphatic, monocarboxylic acid or a $C_{1-4}$ alkyl acrylate or methacrylate and with an $\alpha,\beta$-unsaturated $C_{3-10}$ carboxylic acid in respective weight proportions of (20–94.5):(5–65):(0-.5–15);

with the provisos that: (a) the sum of all the above percentages of (1), (2), and (3) is 100%; and (b) the pendant carboxylic groups of the polymer blend are neutralized with metal ions to a degree of at least 10%.

DETAILED DESCRIPTION OF THE INVENTION

All the three types of polymers which form the blends of the present invention can be made by addition polymerization of the appropriate monomers according to methods generally known to the art. Thus, copolymers of chloroprene with $\alpha,\beta$-unsaturated carboxylic acids can be made following the teachings of U.S. Pat. Nos. 2,066,331 to Carothers and 2,356,091 to Roedel. These copolymers (hereafter, occasionallly called copolymers of the first type) contain, in addition to chloroprene, a mono- or dicarboxylic acid comonomer such as, for example, acrylic, methacrylic, ethacrylic, itaconic, maleic, or fumaric acid; or a monoester of a dicarboxylic acid, for example, methyl hydrogen fumarate, ethyl hydrogen maleate, methyl hydrogen maleate or methyl hydrogen itaconate. The preferred carboxylic comonomer is methacrylic acid, and the preferred proportion of the carboxylic comonomer is about 0.5–15 weight percent of the copolymer.

The copolymers of the second type (copolymers of ethylene with an $\alpha,\beta$-unsaturated carboxylic acid) contain the same type of carboxylic comonomers as the copolymers of the first type, and the preferred proportions of such comonomers are the same. Copolymers of the second type suitable in the compositions of the present invention are described in U.S. Pat. No. 3,437,718 to Rees. When the proportion of the copolymer of the second type in the blend is within the range recited in the Summary of the Invention, the final blend has a practically low melt viscosity at normal processing temperatures of about 120°–170° C. and good tensile properties.

The third type of copolymers can be made according to the teachings of U.S. Pat. No. 3,215,678 to Adelman. Typical vinyl esters that can be copolymerized with ethylene and the $\alpha,\beta$-unsaturated $C_{3-10}$ carboxylic acid include vinyl formate, vinyl acetate, vinyl propionate, and vinyl butyrate. Vinyl acetate is the preferred vinyl ester comonomer. Typical copolymerizable $C_{1-4}$ alkyl acrylates and methacrylates include, for example, the isobutyl, ethyl, and preferably methyl esters of acrylic and methacrylic acids. The terpolymers of the third type contain the same type of $\alpha,\beta$-unsaturated carboxylic comonomers as the copolymers of the first and second types, and the preferred proportions of such comonomers again are the same. It will be clear to one skilled in the art that more than one copolymer of each type can be present in the blend, so long as the total proportion of all copolymers of each type is within the approximate limits indicated above in the Summary of the Invention. Furthermore, the copolymers of each type can themselves contain more than one comonomer (for example, a copolymer containing both acrylic and methacrylic acids). Finally, each copolymer may also contain a minor proportion of another ethylenically unsaturated comonomer, for example, an alkyl ester of an $\alpha,\beta$-unsaturated carboxylic acid, such as methyl methacrylate, ethyl acrylate, and dibutyl maleate. All such copolymers and their blends, when used in such proportions that the quantitative limitations recited in the Summary of the Invention are met, are intended to be within the scope of the invention.

As stated earlier, the blends of this invention should have their pendant carboxylic groups neutralized to a degree of at least 10%; that is, at least 10% of all those groups should be converted to ionic carboxylate form, while positive charge is supplied by metal ions. In practice, this is best accomplished by thoroughly mixing the requisite proportions of the copolymers of all three types and intimately contacting the resulting blend with a metal ion source. Suitable metal ion sources are, among others, metal formates, acetates, hydroxides soluble in water at room temperature to the extent of at least about 2%, methoxides, ethoxides, carbonates, bicarbonates, and complexes with various organic and inorganic molecules, especially chelating agents. Generally speaking, the same types of suitable metal ion sources as are named in U.S. Pat. No. 3,437,718 can be used in the compositions of the invention. The specification of U.S. Pat. No. 3,437,718 is, therefore, incorporated herein by reference. In addition, various reactive metal oxides are also suitable ion sources, although they are usually more difficult to disperse. Suitable metal ions are those having a valence of 1 to 3, particularly those of Groups Ia, IIa, IIb, and IIIb of the Periodic Chart of the Elements and the transition metals. The preferred metal ion is $Zn^{+2}$.

Instead of neutralizing the polymer blend, it is possible to neutralize one or more of the constituent, $\alpha,\beta$-carboxylic acid comonomers prior to copolymerization. The resultant polymers containing ionized carboxylate groups are generically known as ionomers. These ionomers can be blended among themselves or with free carboxylic group-containing copolymers. Additional metal ions can be added as desired to obtain any degree of neutralization. It is preferred to achieve at least a 50% degree of neutralization. The neutralized blend of three ionomers can be called a terionomer blend. The terionomer blend is a crosslinked material, the crosslinking resulting from ionic attraction between the metal ions and the carboxylic ions. These crosslinked blends are uniform and homogeneous, even though blends of these same copolymers prior to neutralization may be inhomogeneous, nonuniform, or incompatible. The terionomer blends have very desirable physical properties and ozone resistance as well as low flammability. They can be made into a wide variety of useful articles by conventional methods such as, for example, extrusion or injection-molding. They also can be foamed. Typical fabricated articles that can be made from these terionomer blends include, for example, gaskets, O-rings, extruded wire and cable coverings, shoe soles, hoses, foam insulation, etc.

The preferred terionomer blends of the present invention are those comprising, by weight (1) 45–65%, especially about 50%, of a chloroprene/methacrylic acid copolymer wherein methacrylic acid constitutes about 1–5% of the copolymer weight; (2) 15–30%, especially about 25%, of an ethylene/methacrylic acid copolymer containing 8–15% of methacrylic acid; and (3) 15–30%, preferably 25%, of an ethylene/vinyl acetate/methacrylic acid terpolymer wherein the proportions of vinyl acetate and of methacrylic acid are, respectively, 20–30% and 1–5%; the terionomer blend being neutralized to a degree of at least 50% with zinc.

This invention is now illustrated by the following representative examples of certain preferred embodiments thereof, where all parts, proportions, and percentages are by weight, unless otherwise indicated. The following abbreviations are used throughout the tables.

Ac = acetate
AcAc = acetyl acetonate
E = ethylene
IBA = isobutyl acrylate
"Irganox" 1076 (Ciba-Geigy) = N-octadecyl-3,5-di-t-butyl-4-hydroxyhydrocinnamamide
"Irganox" 1098 (Ciba-Geigy) = N,N'-1,6-hexamethylenebis(3,5,-di-t-butyl-4-hydroxyhydrocinnamamide)
MAA = methacrylic acid
MA = methyl acrylate
St = stearate
MAME = methyl hydrogen maleate
TNMP = tris(5-norbornene-2-methyl)phosphite
VA = vinyl acetate
"Wingstay" 100 (Goodyear) = Butylated reaction product of p-cresol and dicylopentadiene

EXAMPLES 1 TO 37

Varying proportions of a chloroprene/methacrylic acid copolymer containing either 1% or 10% of methacrylic acid, an ethylene/methacrylic acid copolymer containing 12% methacrylic acid, and an ethylene/vinyl acetate/methacrylic acid terpolymer containing 28% vinyl acetate and 1% methacrylic acid were mixed together in a Brabender "Prep. Center" mixer at 120° C. Stearic acid (0.5 phr), a 5 to 1 mixture (1 phr) of "Irganox" 1076 and "Irganox" 1098 antioxidants of Ciba-Geigy Corporation, and the metal cation source were subsequently added, and the terionomer blend was formed by mixing at 120° C. and 50 rpm for 10 minutes. In Examples 1 to 25, the ethylene/methacrylic acid copolymer was 38% neutralized with zinc cation prior to blending. In all Examples, except Example 36, sufficient metal cation source was added to neutralize 50% of the total carboxyl groups present in the polymer blend. In Example 36, the final terionomer neutralization was only 25%. Examples 34 and 35 are mixed metal terionomers containing 60% zinc cation from the neutralized ethylene/methacrylic acid copolymer and 40% cation from the added metal cation source.

Stock samples were compression-molded in a preheated mold at 150° C. for 7 minutes, followed by rapid cooling. Physical properties are shown in Table I. Stress/strain properties were obtained according to ASTM D395, Method B using a heat treatment of 22 hours at both 23° C. and 70° C. Hardness (durometer A) was measured at 23° C. by ASTM D2240-64T.

The following abbreviations are used for the stress/strain properties in Tables I–III:
$M_{100}$—modulus at 100% elongation (MPa)
$T_B$—tensile strength at break (MPa)
$E_B$—Elongation at break (%)
P.S.—permanent set (%)
Compression Set—(22 hrs.) (%)

TABLE I

| TERIONOMER BLEND | EXAMPLE | | | | |
|---|---|---|---|---|---|
| | 1 | 2 | 3 | 4 | 5 |
| Chloroprene/MAA(phr) | 59 | 59 | 60 | 61 | 50 |
| % MAA | 1 | 1 | 1 | 1 | 1 |
| E/VA/MAA (phr) | 29 | 25 | 20 | 15 | 35 |
| E/MAA (phr) | 12 | 16 | 20 | 24 | 15 |
| %MAA Neutralized | 38 | 38 | 38 | 38 | 38 |
| Metal Cation | Zn(II) | Zn(II) | Zn(II) | Zn(II) | Zn(II) |
| Metal Source | Zn(AcAc)$_2$ | Zn(AcAc)$_2$ | Zn(AcAc)$_2$ | Zn(AcAc)$_2$ | Zn(AcAc)$_2$ |
| % MAA Neutralized(Tot.) | 50 | 50 | 50 | 50 | 50 |
| Physical Properties | | | | | |
| Shore A Hardness | 72 | 68 | 79 | 70 | 83 |
| Stress/Strain (23° C.) | | | | | |
| $M_{100}$ | 3.8 | 3.1 | 4.1 | 3.1 | 3.8 |

TABLE I-continued

|  | | | | | |
|---|---|---|---|---|---|
| $T_B$ | 10 | 10.6 | 12.4 | 7.9 | 11.4 |
| $E_B$ | 400 | 480 | 480 | 300 | 520 |
| P.S. | 80 | 65 | 68 | 31 | 160 |
| Stress/Strain (70° C.) | | | | | |
| $M_{100}$ | — | 1.3 | 1.4 | — | 1.0 |
| $T_B$ | 0.8 | 1.4 | 1.6 | 1.1 | 1.5 |
| $E_B$ | 80 | 110 | 140 | 80 | 200 |
| Compression Set | | | | | |
| 23° C. | 27 | — | 23 | — | 55 |
| 70° C. | 75 | — | 66 | — | — |
| Melt Viscosity (150° C., 700 s$^{-1}$) (Pa.s) | 970 | 780 | 1040 | 1000 | 770 |

| | EXAMPLE | | | |
|---|---|---|---|---|
| TERIONOMER BLEND | 6 | 7 | 8 | 9 |
| Chloroprene/MAA(phr) | 50 | 52 | 50 | 55 |
| % MAA | 1 | 1 | 1 | 1 |
| E/VA/MAA (phr) | 30 | 30 | 25 | 20 |
| E/MAA (phr) | 20 | 18 | 25 | 25 |
| % MAA Neutralized | 38 | 38 | 38 | 38 |
| Metal Cation | Zn(II) | Zn(II) | Zn(II) | Zn(II) |
| Metal Source | Zn(AcAc)$_2$ | Zn(AcAc)$_2$ | Zn(AcAc)$_2$ | Zn(AcAc)$_2$ |
| % MAA Neutralized(Tot.) | 50 | 50 | 50 | 50 |
| Physical Properties | | | | |
| Shore A Hardness | 75 | 72 | 79 | 87 |
| Stress/Strain (23° C.) | | | | |
| $M_{100}$ | 4.5 | 4.5 | 3.8 | 4.5 |
| $T_B$ | 14.8 | 11.7 | 11.4 | 12.4 |
| $E_B$ | 550 | 420 | 530 | 530 |
| P.S. | 145 | 85 | 109 | 120 |
| Stress/Strain (70° C.) | | | | |
| $M_{100}$ | 1.5 | 1.4 | 1.3 | 1.4 |
| $T_B$ | 2.1 | 1.5 | 1.7 | 1.9 |
| $E_B$ | 200 | 130 | 200 | 200 |
| Compression Set | | | | |
| 23° C. | 27 | 21 | 35 | — |
| 70° C. | — | 84 | 80 | 77 |
| Melt Viscosity (150° C. 700s$^{-1}$) (Pa.s) | 840 | 860 | 810 | 970 |

| | EXAMPLE | | | |
|---|---|---|---|---|
| TERIONOMER BLEND | 10 | 11 | 12 | 13 |
| Chloroprene/MAA(phr) | 52 | 55 | 40 | 40 |
| % MAA | 1 | 1 | 1 | 1 |
| E/VA/MAA (phr) | 17 | 10 | 40 | 35 |
| E/MAA (phr) | 31 | 35 | 20 | 25 |
| % MAA Neutralized | 38 | 38 | 38 | 38 |
| Metal Cation | Zn(II) | Zn(II) | Zn(II) | Zn(II) |
| Metal Source | Zn(AcAc)$_2$ | Zn(AcAc)$_2$ | Zn(AcAc)$_2$ | Zn(AcAc)$_2$ |
| % MAA Neutralized(Tot.) | 50 | 50 | 50 | 50 |
| Physical Properties | | | | |
| Shore A Hardness | 89 | 93 | 78 | 88 |
| Stress/Strain (23° C.) | | | | |
| $M_{100}$ | 5.1 | 6.6 | 3.8 | 4.5 |
| $T_B$ | 13.1 | 14.5 | 10.0 | 11.0 |
| $E_B$ | 520 | 400 | 500 | 500 |
| P.S. | 150 | 111 | 129 | 200 |
| Stress/Strain (70° C.) | | | | |
| $M_{100}$ | 1.6 | 1.9 | 1.2 | 1.1 |
| $T_B$ | 2.3 | 3.2 | 1.5 | 1.6 |
| $E_B$ | 380 | 360 | 210 | 360 |
| Compression Set | | | | |
| 23° C. | — | 67 | 27 | — |
| 70° C. | 82 | — | 97 | 92 |
| Melt Viscosity (150° C., 700 s$^{-1}$) (Pa.s) | 920 | — | 740 | 700 |

| | EXAMPLE | | | |
|---|---|---|---|---|
| TERIONOMER BLEND | 14 | 15 | 16 | 17 |
| Chloroprene/MAA(phr) | 45 | 40 | 45 | 45 |
| % MAA | 1 | 1 | 1 | 1 |
| E/VA/MAA (phr) | 30 | 30 | 25 | 20 |
| E/MAA (phr) | 25 | 30 | 30 | 35 |
| % MAA Neutralized | 38 | 38 | 38 | 38 |
| Metal Cation | Zn(II) | Zn(II) | Zn(II) | Zn(II) |
| Metal Source | Zn(AcAc)$_2$ | Zn(AcAc)$_2$ | Zn(AcAc)$_2$ | Zn(AcAc)$_2$ |
| % MAA Neutralized(Tot.) | 50 | 50 | 50 | 50 |
| Physical Properties | | | | |

TABLE I-continued

| | | | | |
|---|---|---|---|---|
| Shore A Hardness | 81 | 85 | 84 | 92 |
| Stress/Strain (23° C.) | | | | |
| $M_{100}$ | 4.1 | 5.2 | 4.8 | 6.5 |
| $T_B$ | 12.0 | 12.8 | 12.4 | 13.8 |
| $E_B$ | 520 | 500 | 490 | 500 |
| P.S. | 145 | 155 | 135 | 185 |
| Stress/Strain (70° C.) | | | | |
| $M_{100}$ | 1.3 | 1.5 | 1.5 | 1.9 |
| $T_B$ | 2.0 | 2.1 | 2.2 | 3.0 |
| $E_B$ | 310 | 325 | 310 | 480 |
| Compression Set | | | | |
| 23° C. | 30 | 39 | 32 | — |
| 70° C. | 92 | 95 | 91 | 90 |
| Melt Viscosity | | | | |
| (150° C., 700 $s^{-1}$) | | | | |
| (Pa.s) | 790 | 830 | 820 | 820 |

| | EXAMPLE | | | |
|---|---|---|---|---|
| TERIONOMER BLEND | 18 | 19 | 20 | 21 |
| Chloroprene/MAA(phr) | 40 | 43 | 37 | 36.5 |
| % MAA | 1 | 1 | 1 | 1 |
| E/VA/MAA (phr) | 20 | 14 | 28 | 27 |
| E/MAA (phr) | 40 | 43 | 35 | 36.5 |
| % MAA Neutralized | 38 | 38 | 38 | 38 |
| Metal Cation | Zn(II) | Zn(II) | Zn(II) | Zn(II) |
| Metal Source | Zn(AcAc)$_2$ | Zn(AcAc)$_2$ | Zn(AcAc)$_2$ | Zn(AcAc)$_2$ |
| % MAA Neutralized(Tot.) | 50 | 50 | 50 | 50 |
| Physical Properties | | | | |
| Shore A Hardness | 88 | 85 | 87 | 84 |
| Stress/Strain (23° C.) | | | | |
| $M_{100}$ | 6.2 | 4.8 | 5.9 | 6.3 |
| $T_B$ | 14.5 | 13.1 | 13.8 | 16.6 |
| $E_B$ | 480 | 510 | 490 | 520 |
| P.S. | 168 | 180 | 173 | 250 |
| Stress/Strain (70° C.) | | | | |
| $M_{100}$ | 2.0 | 1.7 | 1.9 | 1.9 |
| $T_B$ | 3.0 | 2.5 | 3.1 | 2.1 |
| $E_B$ | 360 | 300 | 460 | 200 |
| Compression Set | | | | |
| 23° C. | 40 | — | 38 | 46 |
| 70° C. | 98 | — | — | 95 |
| Melt Viscosity | | | | |
| (150° C., 700 $s^{-1}$) | | | | |
| (Pa.s) | 840 | 840 | — | 780 |

| | EXAMPLE | | | |
|---|---|---|---|---|
| TERIONOMER BLEND | 22 | 23 | 24 | 25 |
| Chloroprene/MAA(phr) | 35 | 30 | 30 | 35 |
| % MAA | 1 | 1 | 1 | 1 |
| E/VA/MAA (phr) | 20 | 35 | 30 | 20 |
| E/MAA (phr) | 45 | 35 | 40 | 45 |
| % MAA Neutralized | 38 | 38 | 38 | 38 |
| Metal Cation | Zn(II) | Zn(II) | Zn(II) | Zn(II) |
| Metal Source | Zn(AcAc)$_2$ | Zn(AcAc)$_2$ | Zn(AcAc)$_2$ | Zn(AcAc)$_2$ |
| % MAA Neutralized(Tot.) | 50 | 50 | 50 | 50 |
| Physical Properties | | | | |
| Shore A Hardness | 95 | 92 | 89 | 94 |
| Stress/Strain (23° C.) | | | | |
| $M_{100}$ | 8.3 | 6.6 | 6.3 | 6.9 |
| $T_B$ | 15.5 | 13.4 | 13.6 | 12.8 |
| $E_B$ | 380 | 460 | 480 | 410 |
| P.S. | 190 | 240 | 196 | 220 |
| Stress/Strain (70° C.) | | | | |
| $M_{100}$ | 2.3 | 1.7 | 1.7 | 1.5 |
| $T_B$ | 4.9 | 2.6 | 2.7 | 2.1 |
| $E_B$ | 490 | 360 | 480 | 310 |
| Compression Set | | | | |
| 23° C. | 76 | 68 | 41 | 68 |
| 70° C. | — | — | — | — |
| Melt Viscosity | | | | |
| (150° C., 700 $s^{-1}$) | | | | |
| (Pa.s) | — | 610 | 740 | — |

| | EXAMPLE | | | |
|---|---|---|---|---|
| TERIONOMER BLEND | 26 | 27 | 28 | 29 |
| Chloroprene/MAA(phr) | 50 | 50 | 50 | 50 |
| % MAA | 1 | 1 | 1 | 1 |
| E/VA/MAA (phr) | 25 | 25 | 25 | 25 |
| E/MAA (phr) | 25 | 25 | 25 | 25 |
| % MAA Neutralized | — | — | — | — |
| Metal Cation | Zn(II) | Cr(III) | Co(II) | Fe(II) |

TABLE I-continued

| Metal Source | Zn(AcAc)$_2$ | Cr(AcAc)$_3$ | Co(AcAc)$_2$ | Fe(AcAc)$_2$ |
|---|---|---|---|---|
| % MAA Neutralized(Tot.) | 50 | 50 | 50 | 50 |
| Physical Properties | | | | |
| Shore A Hardness | 86 | 87 | 87 | 87 |
| Stress/Strain (23° C.) | | | | |
| $M_{100}$ | 4.8 | 5.9 | 6.2 | 6.2 |
| $T_B$ | 8.3 | 11.0 | 11.7 | 11.4 |
| $E_B$ | 340 | 420 | 490 | 490 |
| P.S. | 130 | 155 | 149 | 149 |
| Stress/Strain (70° C.) | | | | |
| $M_{100}$ | 1.3 | 1.7 | 1.4 | 1.8 |
| $T_B$ | 1.7 | 1.9 | 1.8 | 2.3 |
| $E_B$ | 200 | 160 | 190 | 210 |
| Compression Set | | | | |
| 23° C. | 58 | 49 | 56 | 56 |
| 70° C. | — | — | — | — |
| Melt Viscosity (150° C., 700 s$^{-1}$) (Pa.s) | 820 | 710 | 680 | 900 |

| | EXAMPLE | | | |
|---|---|---|---|---|
| TERIONOMER BLEND | 30 | 31 | 32 | 33 |
| Chloroprene/MAA(phr) | 50 | 50 | 50 | 50 |
| % MAA | 1 | 1 | 1 | 1 |
| E/VA/MAA (phr) | 25 | 25 | 25 | 25 |
| E/MAA (phr) | 25 | 25 | 25 | 25 |
| % MAA Neutralized | — | — | — | — |
| Metal Cation | Ni(II) | Mn(II) | Cs(II) | Na(I) |
| Metal Source | Ni(AcAc)$_2$ | Mn(AcAc)$_2$ | Cs(AcAc)$_2$ | NaAcAc |
| % MAA Neutralized(Tot.) | 50 | 50 | 50 | 50 |
| Physical Properties | | | | |
| Shore A Hardness | 88 | 88 | 86 | 90 |
| Stress/Strain (23° C.) | | | | |
| $M_{100}$ | 5.2 | 5.5 | 4.8 | 5.5 |
| $T_B$ | 10.0 | 9.7 | 11.7 | 7.0 |
| $E_B$ | 400 | 420 | 650 | 260 |
| P.S. | 260 | 123 | 240 | 55 |
| Stress/Strain (70° C.) | | | | |
| $M_{100}$ | 1.6 | 1.6 | 1.0 | — |
| $T_B$ | 2.1 | 1.7 | 1.3 | 1.4 |
| $E_B$ | 260 | 110 | 200 | 80 |
| Compression Set | | | | |
| 23° C. | 68 | 56 | 49 | 57 |
| 70° C. | — | — | — | — |
| Melt Viscosity (150° C., 700 s$^{-1}$) (Pa.s) | 920 | 600 | 550 | — |

| | EXAMPLE | | | |
|---|---|---|---|---|
| TERIONOMER BLEND | 34 | 35 | 36 | 37 |
| Chloroprene/MAA(phr) | 50 | 50 | 50 | 50 |
| % MAA | 1 | 1 | 10 | 10 |
| E/VA/MAA (phr) | 25 | 25 | 25 | 25 |
| E/MAA (phr) | 25 | 25 | 25 | 25 |
| % MAA Neutralized | 38 | 38 | — | — |
| Metal Cation | Zn(II)/Mg(II) | Zn(II)/Ca(II) | K(I) | K(I) |
| Metal Source | Mg(AcAc)$_2$ | Ca(AcAc)$_2$ | KOH | KOH |
| % MAA Neutralized(Tot.) | 50 | 50 | 25 | 50 |
| Physical Properties | | | | |
| Shore A Hardness | 88 | 88 | 85 | 86 |
| Stress/Strain (23° C.) | | | | |
| $M_{100}$ | 5.5 | 5.5 | 4.4 | 4.8 |
| $T_B$ | 12.4 | 11.7 | 6.0 | 7.1 |
| $E_B$ | 480 | 480 | 300 | 330 |
| P.S. | 140 | 140 | 72 | 77 |
| Stress/Strain (70° C.) | | | | |
| $M_{100}$ | 1.6 | 1.4 | — | 1.1 |
| $T_B$ | 2.3 | 2.1 | 1.0 | 1.1 |
| $E_B$ | 270 | 250 | 90 | 100 |
| Compression Set | | | | |
| 23° C. | 61 | 58 | — | — |
| 70° C. | — | — | — | — |
| Melt Viscosity (150° C., 700 s$^{-1}$) (Pa.s) | 840 | 960 | — | — |

EXAMPLES 38 TO 57

Terionomer blends were prepared by mixing in a Brabender mixer at 120° C. varying proportions of a chloroprene/methacrylic acid copolymer in which methacrylic acid constituted 1% of the copolymer, an ethylene/methacrylic acid copolymer, optionally, partially neutralized with a metal cation, and an ethylene/vinyl acetate/methacrylic acid terpolymer. The polymers contained varying amounts of methacrylic acid and vinyl acetate. In some cases, isobutyl acrylate was used as a comonomer in the ethylene/methacrylic acid copolymer to interrupt polyethylene crystallinity and provide a softer, more extendable terionomer.

A 5 to 1 mixture of "Irganox" 1076/1098 antioxidant of Ciba-Geigy Corporation, magnesium oxide or stearate acid acceptor, and the metal source were subsequently added, and the terionomer blend was formed by mixing at 120° for 7 to 10 minutes at 40 to 60 rpm, corresponding to a maximum shear rate of about 150 s$^{-1}$. During the course of mixing and terionomer formation, stock temperature in the mixing chamber rose 10° to 15° C. The terionomer was subsequently unloaded and injection-molded into slabs for property determination.

Injection-molded slabs (51 mm×127 mm×1.9 mm) were prepared in a Newbury Ram machine. Barrel and nozzle temperatures were 160° to 170° C., and ram pressures ranged from 0.05 to 82.7 MPa, depending on terionomer viscosity.

Oil volume swell was determined by ASTM D471 using ASTM No. 1 aliphatic oil and ASTM No. 3 aromatic oil (seven days immersion at 23° C. and 70° C.). Resistance to aliphatic oil was much better than that to aromatic oil and volume swell was typically 5 to 10 times greater at 70° C. than at 23° C. The compositions and physical properties of the terionomers are given in Table II.

TABLE II

| TERIONOMER BLEND | EXAMPLE | | | |
|---|---|---|---|---|
| | 38 | 39 | 40 | 41 |
| Chloroprene/MAA(phr) | 25 | 45 | 45 | 45 |
| E/VA/MAA (phr) | 35 | 15 | 15 | 8 |
| %VA | 28 | 28 | 28 | 28 |
| %MAA | 1 | 1 | 1 | 1 |
| E/MAA (phr) | 40 | 40 | 40 | 47 |
| % MAA | 10 | 10 | 10 | 10 |
| % IBA | — | — | 10 | 10 |
| % MAA Neutralized | — | — | 73 | 73 |
| Metal Cation | Zn(II)/Al(III) | Zn(II) | Zn(II) | Zn(II) |
| Metal Source | ZnO/Al(AcAc)$_3$ | ZnO | ZnO | ZnO |
| % MAA Neutralized(Tot.). | 100 | 75 | 100 | 100 |
| Acid Acceptor (phr) | — | — | — | — |
| "Irganox" 1076/1098 Antioxidant (phr) | 2.0/0.4 | 4.0/0.8 | 4.0/0.8 | 4.0/0.8 |
| Physical Properties | | | | |
| Stress/Strain (23° C.) | | | | |
| $M_{100}$ | 9.0 | — | — | — |
| $T_B$ | 10.7 | 18.2 | 17.2 | 18.1 |
| $E_B$ | 140 | 60 | 65 | 65 |
| P.S. | 23 | 5 | 4 | 4 |
| Stress/Strain (70° C.) | | | | |
| $M_{100}$ | — | — | — | — |
| $T_B$ | 2.2 | 4.7 | 5.3 | 6.3 |
| $E_B$ | 70 | 40 | 70 | 100 |
| Oil Swell ($\Delta V/V_1$, %) | | | | |
| (7 days immersion) | | | | |
| 23° C. ASTM No. 1 Oil | 1.4 | 0.8 | 1.3 | 1.0 |
| ASTM No. 3 Oil | 16.4 | 10.4 | 16.9 | 14.0 |
| 70° C. ASTM No. 1 Oil | 32.7 | 13.4 | 27.6 | 21.8 |
| ASTM No. 3 Oil | 97.4 | 93.9 | 174.6 | 180.7 |
| TERIONOMER BLEND | EXAMPLE | | | |
| | 42 | 43 | 44 | 45 |
| Chloroprene/MAA(phr) | 45 | 50 | 50 | 60 |
| E/VA/MAA (phr) | 15 | 17 | 17 | 30 |
| % VA | 28 | 28 | 28 | 28 |
| % MAA | 1 | 1 | 1 | 1 |
| E/MAA (phr) | 40 | 33 | 33 | 10 |
| % MMA | 10 | 12 | 10 | 10 |
| % IBA | 10 | — | 10 | 10 |
| % MAA Neutralized | 73 | 38 | 73 | 73 |
| Metal Cation | Na(I) | Zn(II)/Ca(II) | Zn(II) | Zn(II) |
| Metal Source | NaAcAc | ZnO/CaSt$_2$ | ZnO | Zn(AcAc)$_2$ |
| % MAA Neutralized(Tot.) | 75 | 100 | 100 | 75 |
| Acid Acceptor (phr) | — | 3.8 MgO | 3.8 MgO | 3.8 MgO |
| "Irganox" 1076/1098 Antioxidant (phr) | 4.0/0.8 | 8.8/1.8 | 8.8/1.8 | 2.0/0.4 |
| Physical Properties | | | | |
| Stress/Strain (23° C.) | | | | |
| $M_{100}$ | — | — | — | 9.0 |
| $T_B$ | 12.9 | 19.0 | 16.6 | 11.8 |
| $E_B$ | 115 | 30 | 85 | 140 |
| P.S. | 8 | 5 | 5 | 7 |
| Stress/Strain (70° C.) | | | | |
| $M_{100}$ | — | — | — | — |
| $T_B$ | 2.8 | 8.3 | 7.4 | 3.2 |
| $E_B$ | 40 | 90 | 95 | 90 |
| Oil Swell ($\Delta V/V_1$, %) | | | | |
| (7 days immersion) | | | | |
| 23° C. ASTM No. 1 Oil | 1.1 | 0.9 | 0.9 | 2.4 |

TABLE II-continued

| | | | | |
|---|---|---|---|---|
| ASTM No. 3 Oil | 17.2 | 12.5 | 16.5 | 31.1 |
| 70° C. ASTM No. 1 Oil | 21.9 | 13.8 | 24.6 | 45.2 |
| ASTM No. 3 Oil | 156.1 | 96.8 | 156.3 | 108.2 |

| | EXAMPLE | | | |
|---|---|---|---|---|
| TERIONOMER BLEND | 46 | 47 | 48 | 49 |
| Chloroprene/MAA(phr) | 25 | 45 | 60 | 50 |
| E/VA/MAA (phr) | 35 | 15 | 30 | 25 |
| % VA | 28 | 28 | 28 | 28 |
| % MAA | 1 | 1 | 1 | 1 |
| E/MAA (phr) | 40 | 40 | 10 | 25 |
| % MAA | 10 | 10 | 10 | 12 |
| % IBA | 10 | 10 | 10 | — |
| %MAA Neutralized | 73 | 73 | 73 | 38 |
| Metal Cation | Zn(II) | Zn(II) | Zn(II) | Zn(II) |
| Metal Source | Zn(AcAc)$_2$ | Zn(AcAc)$_2$ | ZnO | Zn(AcAc)$_2$ |
| % MAA Neutralized (Tot.) | 75 | 75 | 100 | 50 |
| Acid Acceptor (phr) | 0.6 MgO | 6.7MgSI$_2$ | 6.7 MgSt$_2$ | 6.7 MgSt$_2$ |
| "Irganox" 1076/1098 Antioxident (phr) | 2.0/0.4 | 2.0/0.4 | 2.0/0.4 | 2.0/0.4 |
| Physical Properties | | | | |
| Stress/Strain (23° C.) | | | | |
| $M_{100}$ | — | 13.4 | 6.3 | — |
| $T_B$ | 16.1 | 15.6 | 7.2 | 15.1 |
| $E_B$ | 80 | 160 | 135 | 75 |
| P.S. | 7 | 20 | 60 | 5 |
| Stress/Strain (70° C.) | | | | |
| $M_{100}$ | — | — | — | — |
| $T_B$ | 4.2 | 9.4 | 2.1 | 4.5 |
| $E_B$ | 100 | 165 | 100 | 45 |
| Oil Swell ($\Delta V/V_1$, %) (7 days immersion) | | | | |
| 23° C. ASTM No. 1 Oil | 1.5 | 1.1 | 2.1 | 0.3 |
| ASTM No. 3 Oil | 19.4 | 17.4 | 30.1 | 10.9 |
| 70° C. ASTM No. 1 Oil | 48.8 | 27.6 | 33.3 | 38.6 |
| ASTM No. 3 Oil | 131.1 | 171.6 | 94.8 | 142.6 |

| | EXAMPLE | | | |
|---|---|---|---|---|
| TERIONOMER BLEND | 50 | 51 | 52 | 53 |
| Chloroprene/MAA(phr) | 50 | 50 | 50 | 50 |
| E/VA/MAA (phr) | 25 | 25 | 25 | 25 |
| % VA | 28 | 28 | 28 | 25 |
| %MAA | 1 | 1 | 1 | 1 |
| E/MAA (phr) | 25 | 25 | 25 | 25 |
| % MAA | 10 | 10 | 10 | 12 |
| % IBA | 10 | — | 10 | — |
| % MAA Neutralized | 73 | 50 | 73 | 38 |
| Metal Cation | Zn(II) | Na(I) | Na(I) | Zn(II) |
| Metal Source | ZnO | NaAc | NaAc | Zn(AcAc)$_2$ |
| % MAA Neutralized(Tot.) | 55 | 50 | 50 | 50 |
| Acid Acceptor (phr) | 6.7 MgSt$_2$ | 6.7 MgSt$_2$ | 6.7 MgSt$_2$ | 6.7 MgSt$_2$ |
| "Irganox" 1076/1098 Antioxidant (phr) | 2.0/0.4 | 2.0/0.4 | 2.0/0.4 | 2.0/0.4 |
| Physical Properties | | | | |
| Stress/Strain (23° C.) | | | | |
| $M_{100}$ | 7.8 | — | 10.8 | — |
| $T_B$ | 10.8 | 11.6 | 12.0 | 9.1 |
| $E_B$ | 200 | 100 | 170 | 80 |
| P.S. | 30 | 10 | 20 | 8 |
| Stress/Strain (70° C.) | | | | |
| $M_{100}$ | — | — | — | — |
| $T_B$ | 2.5 | 4.1 | 2.9 | 2.1 |
| $E_B$ | 105 | 50 | 80 | 60 |
| Oil Swell ($\Delta V/V_1$, %) (7 days immersion) | | | | |
| 23° C. ASTM No. 1 Oil | 0.9 | 0.7 | 0.7 | 0.6 |
| ASTM No. 3 Oil | 13.2 | 11.9 | 13.9 | 16.2 |
| 70° C. ASTM No. 1 Oil | 44.7 | 35.7 | 35.3 | 78.1 |
| ASTM No. 3 Oil | >200 | 133.1 | >200 | 161.2 |

| | EXAMPLE | | | |
|---|---|---|---|---|
| TERIONOMER BLEND | 54 | 55 | 56 | 57 |
| Chloroprene/MAA(phr) | 50 | 50 | 50 | 50 |
| E/VA/MAA (phr) | 25 | 25 | 25 | 25 |
| % VA | 25 | 25 | 25 | 28 |
| % MAA | 1 | 1 | 1 | 5 |
| E/MAA (phr) | 25 | 25 | 25 | 25 |
| % MAA | 10 | 10 | 10 | 10 |
| % IBA | 10 | — | 10 | 10 |
| % MAA Neutralized | 73 | 50 | 73 | 73 |
| Metal Cation | Zn(II) | Na(I) | Na(I) | Zn(II) |

TABLE II-continued

| Metal Source | ZnO | NaAc | NaAc | ZnO |
|---|---|---|---|---|
| % MAA Neutralized(Tot.) | 55 | 50 | 50 | 42 |
| Acid Acceptor (phr) | 6.7 MgSt$_2$ | 6.7 MgSt$_2$ | 6.7 MgSt$_2$ | 6.7 MgSt$_2$ |
| "Irganox" 1076/1098 Antioxidant (phr) | 2.0/0.4 | 2.0/0.4 | 2.0/0.4 | 2.0/0.4 |
| Physical Properties | | | | |
| Stress/Strain (23° C.) | | | | |
| $M_{100}$ | 6.3 | — | 5.7 | 4.5 |
| $T_B$ | 6.7 | 6.2 | 6.1 | 7.8 |
| $E_B$ | 120 | 100 | 160 | 310 |
| P.S. | 15 | 15 | 25 | 70 |
| Stress/Strain (70° C.) | | | | |
| $M_{100}$ | — | — | — | 1.3 |
| $T_B$ | 1.2 | 1.2 | 0.9 | 1.6 |
| $E_B$ | 95 | 85 | 140 | 225 |
| Oil Swell ($\Delta V/V_1$, %) (7 days immersion) | | | | |
| 23° C. ASTM No. 1 Oil | 1.4 | 1.3 | 1.4 | 0.0 |
| ASTM No. 3 Oil | 24.4 | 21.0 | 25.9 | 8.5 |
| 70° C. ASTM No. 1 Oil | 44.4 | 29.1 | 33.6 | 18.8 |
| ASTM No. 3 Oil | >200 | 133 | 136.5 | 180 |

EXAMPLES 58 TO 82

Terionomer blends were prepared and injection molded by the procedure described for Examples 38 to 57. From 3.5 to 11 phr of Sb$_2$O$_3$ was included in the blends as flame retardant. In Examples 77 to 81, 1.4 phr of "Wingstay" 100 of Goodyear Rubber & Tire Company of tris(5-norbornene-2-methyl) phosphite was added to provide ozone resistance.

Static ozone resistance was measured according to ASTM D518-61 by exposing stock samples to ozone in a test chamber at 40° C. using an ozone concentration of 3 ppm for 360 hours. Samples (25 mm×150 mm×1.9 mm thick) were mounted on a varnished wooden rack and subjected to a tensile strain of 40%. Examples 77 to 81 showed no visible cracking after 360 hours of ozone exposure. In contrast, a commercially available styrene/butadiene/styrene (SBS) triblock copolymer containing 1.3 phr "Wingstay" 100 and having comparable mechanical properties failed after only a few hours of ozone exposure, as can be seen in Example 82 (comparative).

Flammability was measured in an ASTM D1692-67T horizontal burn test by applying a Bunsen flame to a 1.27 cm wide and 1.9 mm thick stock sample for 15 seconds. Burn time was measured from the time of flame application. All samples burned without dripping and self-extinguished generally within a half minute. The terionomers were highly resistant to burning even when only 3.5 phr Sb$_2$O$_3$ was used. In contrast, the entire length of the SBS copolymer test strip burned in about 10 minutes, despite the presence of 6.6 phr of Sb$_2$O$_3$. Compositions and physical properties of the terionomers are given in Table III.

TABLE III

| | EXAMPLE | | | |
|---|---|---|---|---|
| TERIONOMER BLEND | 58 | 59 | 60 | 61 |
| Chloroprene/MAA (phr) | 50 | 50 | 50 | 60 |
| % MAA | 1 | 1 | 1 | 1 |
| E/VA/MAA (phr) | 25 | 25 | 25 | 10 |
| % VA | 28 | 28 | 28 | 28 |
| % MAA | 1 | 5 | 1 | 5 |
| E/MAA (phr) | 25 | 25 | 25 | 30 |
| % MAA | 10 | 10 | 12 | 10 |
| % IBA | 10 | 10 | — | 10 |
| % MAA Neutralized | 73 | 73 | — | 73 |
| Metal Cation | Na(I) | Na(I) | Fe(II) | Zn(II) |
| Metal Source | NaAc | NaAc | FeSt$_2$ | ZnO |
| % MAA Neutralized (Tot.) | 100 | 74 | 36 | 89 |
| MgSt$_2$ Acid Acceptor (phr) | 1.2 | 1.2 | 1.2 | 1.2 |
| "Irganox" 1076/1098 Antioxidant (phr) | 0.8/0.2 | 0.8/0.2 | 0.8/0.2 | 0.8/0.2 |
| Sb$_2$O$_3$ (phr) | 11 | 11 | 11 | 11 |
| Stearic Acid (phr) | — | — | — | — |
| "Wingstay"100 (phr) | — | — | — | — |
| TNMP (phr) | — | — | — | — |
| Physical Properties | | | | |
| Stress/Strain (23° C.) | | | | |
| $M_{100}$ | 3.1 | 3.0 | 4.2 | 3.6 |
| $T_B$ | 8.2 | 8.1 | 7.1 | 11.9 |
| $E_B$ | 530 | 580 | 350 | 470 |
| P.S. | 95 | 90 | 65 | 55 |
| Flammability | | | | |
| Burn Time (sec.) | 26 | 24 | 34 | 23 |
| Drip | No | No | No | No |
| Char | Yes | Yes | Yes | Yes |
| Self-Extinguishing | Yes | Yes | Yes | Yes |
| Burn Length (cm.) | 1.91 | 0.64 | 1.91 | 0.33 |
| Static Ozone Resistance | | | | |

TABLE III-continued

| | | | | |
|---|---|---|---|---|
| (40% elongation, 3ppm Ozone, 360 hrs., 40° C.) | — | — | — | — |

| | EXAMPLE | | | |
|---|---|---|---|---|
| TERIONOMER BLEND | 62 | 63 | 64 | 65 |
| Chloroprene/MAA (phr) | 60 | 50 | 50 | 50 |
| % MAA | 1 | 1 | 1 | 1 |
| E/VA/MAA (phr) | 30 | 25 | 17 | 25 |
| % VA | 28 | 28 | 28 | 28 |
| % MAA | 5 | 5 | 1 | 1 |
| E/MAA (phr) | 10 | 25 | 33 | 25 |
| % MAA | 10 | 10 | 10 | 12 |
| % IBA | 10 | 10 | 10 | — |
| % MAA Neutralized | 73 | 73 | 73 | 38 |
| Metal Cation | Zn(II) | Zn(II) | Zn(II) | Zn(II) |
| Metal Source | ZnO | ZnO | ZnO | Zn(AcAc)$_2$ |
| % MAA Neutralized (Tot.) | 59 | 77 | 100 | 50 |
| MgSt$_2$ Acid Acceptor (phr) | 1.2 | 1.2 | 1.2 | 1.6 |
| "Irganox" 1076/1098 Antioxidant (phr) | 0.8/0.2 | 0.8/0.2 | 0.8/0.2 | 0.8/0.2 |
| Sb$_2$O$_3$ (phr) | 11 | 11 | 11 | 6.6 |
| Stearic Acid (phr) | — | — | 1.1 | — |
| "Wingstay"100 (phr) | — | — | — | — |
| TNMP (phr) | — | — | — | — |
| Physical Properties | | | | |
| Stress/Strain (23° C.) | | | | |
| $M_{100}$ | 2.6 | 3.2 | 4.9 | 4.1 |
| $T_B$ | 8.4 | 9.0 | 9.9 | 9.1 |
| $E_B$ | 590 | 495 | 395 | 440 |
| P.S. | 60 | 70 | 80 | 100 |
| Flammability | | | | |
| Burn Time (sec.) | 19 | 21 | 40 | 53 |
| Drip | No | No | No | No |
| Char | Yes | Yes | Yes | Yes |
| Self-Extinguishing | Yes | Yes | Yes | Yes |
| Burn Length (cm.) | 0.33 | 0.33 | 0.64 | 1.27 |
| Static Ozone Resistance (40% elongation, 3ppm Ozone, 360 hrs., 40° C.) | — | — | — | — |

| | EXAMPLE | | | |
|---|---|---|---|---|
| TERIONOMER BLEND | 66 | 67 | 68 | 69 |
| Chloroprene/MAA (phr) | 50 | 50 | 50 | 50 |
| % MAA | 1 | 1 | 1 | 1 |
| E/VA/MAA (phr) | 25 | 25 | 25 | 25 |
| % VA | 28 | 28 | 28 | 25 |
| % MAA | 1 | 1 | 1 | 1 |
| E/MAA (phr) | 25 | 25 | 25 | 25 |
| % MAA | 10 | 10 | 10 | 2 |
| % IBA | 10 | — | 10 | — |
| % MAA Neutralized | 73 | 50 | 73 | 38 |
| Metal Cation | Zn(II) | Na(I) | Na(I) | Zn(II) |
| Metal Source | ZnO | NaAc | NaAc | Zn(AcAc)$_2$ |
| % MAA Neutralized (Tot.) | 55 | 50 | 50 | 50 |
| MgSt$_2$ Acid Acceptor (phr) | 1.6 | 1.6 | 1.6 | 1.6 |
| "Irganox" 1076/1098 Antioxidant (phr) | 0.8/0.2 | 0.8/0.2 | 0.8/0.2 | 0.8/0.2 |
| Sb$_2$O$_3$ (phr) | 6.6 | 6.6 | 6.6 | 6.6 |
| Stearic Acid (phr) | — | — | — | — |
| "Wingstay"100 (phr) | — | — | — | — |
| TNMP (phr) | — | — | — | — |
| Physical Properties | | | | |
| Stress/Strain (23° C.) | | | | |
| $M_{100}$ | 2.6 | 3.8 | 3.1 | 3.2 |
| $T_B$ | 7.9 | 7.8 | 9.7 | 3.2 |
| $E_B$ | 540 | 435 | 545 | 100 |
| P.S. | 95 | 135 | 135 | 10 |
| Flammability | | | | |
| Burn Time (sec.) | 25 | 26 | 28 | 21 |
| Drip | No | No | No | No |
| Char | Yes | Yes | Yes | Yes |
| Self-Extinguishing | Yes | Yes | Yes | Yes |
| Burn Length (cm.) | 0.64 | 0.33 | 0.33 | 0.33 |
| Static Ozone Resistance (40% elongation, 3ppm Ozone, 360 hrs., 40° C.) | — | — | — | — |

| | EXAMPLE | | | |
|---|---|---|---|---|
| TERIONOMER BLEND | 70 | 71 | 72 | 73 |

TABLE III-continued

| | | | | |
|---|---|---|---|---|
| Chloroprene/MAA (phr) | 50 | 50 | 50 | 50 |
| % MAA | 1 | 1 | 1 | 1 |
| E/VA/MAA (phr) | 25 | 25 | 25 | 25 |
| % VA | 25 | 25 | 25 | 28 |
| % MAA | 1 | 1 | 1 | 1 |
| E/MAA (phr) | 25 | 25 | 25 | 25 |
| % MAA | 10 | 10 | 10 | 12 |
| % IBA | 10 | — | 10 | — |
| % MAA Neutralized | 73 | 50 | 73 | — |
| Metal Cation | Zn(II) | Na(I) | Na(I) | Mg(II) |
| Metal Source | ZnO | NaAc | NaAc | Mg(AcAc)$_2$ |
| % MAA Neutralized (Tot.) | 55 | 50 | 50 | 45 |
| MgSt$_2$ Acid Acceptor (phr) | 1.6 | 1.6 | 1.6 | 1.6 |
| "Irganox" 1076/1098 Antioxidant (phr) | 0.8/0.2 | 0.8/0.2 | 0.8/0.2 | 0.8/0.2 |
| Sb$_2$O$_3$ (phr) | 6.6 | 6.6 | 6.6 | 3.5 |
| Stearic Acid (phr) | — | — | — | — |
| "Wingstay"100 (phr) | — | — | — | — |
| TNMP (phr) | — | — | — | — |
| Physical Properties | | | | |
| Stress/Strain (23° C.) | | | | |
| $M_{100}$ | 2.3 | 2.5 | 2.7 | 5.1 |
| $T_B$ | 2.5 | 2.5 | 2.8 | 9.7 |
| $E_B$ | 160 | 100 | 190 | 405 |
| P.S. | 15 | 10 | 30 | 160 |
| Flammability | | | | |
| Burn Time (sec.) | 23 | 26 | 25 | 25 |
| Drip | No | No | No | No |
| Char | Yes | Yes | Yes | Yes |
| Self-Extinguishing | Yes | Yes | Yes | Yes |
| Burn Length (cm.) | 0.33 | 0.33 | 0.33 | 0.64 |
| Static Ozone Resistance (40% elongation, 3ppm Ozone, 360 hrs., 40° C.) | — | — | — | — |

| | EXAMPLE | | | |
|---|---|---|---|---|
| TERIONOMER BLEND | 74 | 75 | 76 | 77 |
| Chloroprene/MAA (phr) | 50 | 57 | 60 | 60 |
| % MAA | 1 | 1 | 1 | 1 |
| E/VA/MAA (phr) | 25 | 29 | 30 | 10 |
| % VA | 28 | 28 | 28 | 28 |
| % MAA | 1 | 1 | 1 | 1 |
| E/MAA (phr) | 25 | 14 | 10 | 30 |
| % MAA | 12 | 12 | 12 | 10 |
| % MAA | — | — | — | 10 |
| % MAA Neutralized | — | — | — | 73 |
| Metal Cation | Zn(II) | Zn(II) | Zn(II) | Na(I) |
| Metal Source | ZnO | ZnO | ZnO | NaAc |
| % MAA Neutralized (Tot.) | 50 | 70 | 86 | 100 |
| MgSt$_2$ Acid Acceptor (phr) | 1.6 | 1.6 | 1.6 | 1.6 |
| "Irganox" 1076/1098 Antioxidant (phr) | 0.8/0.2 | 0.8/0.2 | 0.8/0.2 | 0.8/0.2 |
| Sb$_2$O$_3$ (phr) | 3.5 | 3.5 | 3.5 | 3.5 |
| Stearic Acid (phr) | — | — | — | — |
| "Wingstay" 100 (phr) | — | — | — | 1.4 |
| TNMP (phr) | — | — | — | — |
| Physical Properties | | | | |
| Stress/Strain (23° C.) | | | | |
| $M_{100}$ | 5.3 | 3.8 | 3.0 | 3.3 |
| $T_B$ | 11.5 | 11.1 | 10.7 | 10.9 |
| $E_B$ | 390 | 480 | 485 | 525 |
| P.S. | 115 | 90 | 70 | 80 |
| Flammability | | | | |
| Burn Time (sec.) | 24 | 18 | 17 | 25 |
| Drip | No | No | No | No |
| Char | Yes | Yes | Yes | Yes |
| Self-Extinguishing | Yes | Yes | Yes | Yes |
| Burn Length (cm.) | 0.64 | 0.33 | 0.33 | 0.64 |
| Static Ozone Resistance (40% elongation, 3ppm Ozone, 360 hrs., 40° C.) | — | — | — | No Failure |

| | EXAMPLE | | | | |
|---|---|---|---|---|---|
| TERIONOMER BLEND | 78 | 79 | 80 | 81 | 82 |
| Chloroprene/MAA (phr) | 60 | 50 | 50 | 50 | |
| % MAA | 1 | 1 | 1 | 1 | Commercial |
| E/VA/MAA (phr) | 30 | 25 | 25 | 25 | SBS |
| % VA | 28 | 28 | 28 | 28 | Copolymer |
| % MAA | 1 | 1 | 1 | 1 | (Comparison) |

TABLE III-continued

| | | | | | |
|---|---|---|---|---|---|
| E/MAA (phr) | 10 | 25 | 25 | 25 | |
| % MAA | 10 | 12 | 10 | 10 | |
| % IBA | 10 | — | — | 10 | |
| % MAA Neutralized | 73 | 38 | 50 | 73 | |
| Metal Cation | Na(I) | Zn(II) | Na(I) | Zn(II) | |
| Metal Source | NaAc | Zn(AcAc)$_2$ | NaAc | ZnO | — |
| % MAA Neutralized (Tot.) | 100 | 50 | 50 | 56 | — |
| MgSt$_2$ Acid Acceptor (phr) | 1.6 | 1.6 | 1.6 | 1.6 | — |
| "Irganox" 1076/1098 Antioxidant (phr) | 0.8/0.2 | 0.8/0.2 | 0.8/0.2 | 0.8/0.2 | — |
| Sb$_2$O$_3$ (phr) | 3.5 | 3.5 | 3.5 | 3.5 | 6.6 |
| Stearic Acid (phr) | — | — | — | — | — |
| "Wingstay" 100 (phr) | 1.4 | 1.4 | 1.4 | — | 1.3 |
| TNMP (phr) | — | — | — | 1.4 | — |
| Physical Properties | | | | | |
| Stress/Strain (23° C.) | | | | | |
| $M_{100}$ | 2.3 | 4.4 | 4.1 | 4.6 | 3.6 |
| $T_B$ | 10.7 | 9.7 | 9.6 | 5.4 | 8.2 |
| $E_B$ | 600 | 425 | 480 | 340 | 520 |
| P.S. | 85 | 115 | 155 | 70 | 40 |
| Flammability | | | | | |
| Burn Time (sec.) | 19 | 21 | 18 | 39 | 566 |
| Drip | No | No | No | No | No |
| Char | Yes | Yes | Yes | Yes | Yes |
| Self-Extinguishing | Yes | Yes | Yes | Yes | No |
| Burn Length (cm.) | 0.18 | 0.64 | 0.18 | 0.33 | 15.2 |
| Static Ozone Resistance (40% elongation, 3ppm Ozone, 360 hrs., 40° C.) | No Failure | No Failure | No Failure | No Failure | Failed 2-8 hours |

EXAMPLES 83 TO 84

Terionomer blends were prepared according to the procedure used for Examples 38 to 57 by mixing 50% of (1) a chloroprene/methyacrylic acid copolymer containing 1% of methacrylic acid based on the weight of the copolymer, (2) 25% of an ethylene/methyl acrylate/methyl hydrogen maleate copolymer containing 54% of methyl acrylate and 4% of methyl hydrogen maleate based on the weight of the copolymer and (3) 25% of an ethylene/methacrylic acid/isobutyl acrylate copolymer containing 10% of methacrylic acid and 10% of isobutyl acrylate. In Example 83, 36% of carboxyl groups of the ethylene/methacrylic acid/isobutyl acrylate copolymer were neutralized prior to blending with sodium ions and, in Example 84, 73% of the carboxyl groups were similarly neutralized with zinc cations. In Example 83, sufficient sodium acetate was then added to neutralize 50% of the total carboxyl groups present in the polymer blend. In Example 84, no additional metal cation source was added, so that 56% of the carboxyl groups in the polymer blend were neutralized with zinc cations.

Blend samples were injection-molded for property determination as described in Examples 38 to 57. Stress-strain properties and flammability data are given in Table IV.

TABLE IV

| | Example | |
|---|---|---|
| | 83 | 84 |
| Terionomer Blend | | |
| Chloroprene/MAA (phr) | 50 | 50 |
| E/MA/MAME (phr) | 25 | 25 |
| E/MAA/IBA (phr) | 25 | 25 |
| %MAA Neutralized | 36 | 73 |
| Metal Cation | Na(I) | Zn(II) |
| Metal Source | NaAc | ZnO |
| % MAA Neutralized (total) | 50 | 56 |
| MgSt$_2$ Acid Acceptor (phr) | 1.6 | 1.6 |
| "Irganox" 1076/1098 Antioxidant (phr) | 0.8/0.2 | 0.8/0.2 |
| Sb$_2$O$_3$ (phr) | 3.5 | 3.5 |
| Physical Properties | | |
| Stress/Strain (23° C.) | | |
| $M_{100}$ | — | 2.2 |
| $T_B$ | 12.6 | 6.3 |
| $E_B$ | 100 | 620 |
| P.S. | 18 | 110 |
| Flammability | | |
| Burn Time (sec) | 34 | 21 |
| Drip | No | No |
| Char | Yes | Yes |
| Self-extinguishing | Yes | Yes |
| Burn length (cm.) | 0.64 | 0.33 |

I claim:

1. An elastomeric blend consisting essentially of about:
   (1) 20-80 weight percent of a copolymer of chloroprene with an α,β-unsaturated C$_3$-C$_{10}$ carboxylic acid,
   (2) 10-50 weight percent of a copolymer of ethylene with an α,β-unsaturated C$_3$-C$_{10}$ carboxylic acid, and
   (3) 10-50 weight percent of a terpolymer of ethylene with a vinyl ester of a C$_1$-C$_6$ saturated aliphatic, monocarboxylic acid or a C$_{1-4}$ alkyl acrylate or methacrylate and with an α,β-unsaturated C$_{3-10}$ carboxylic acid in respective weight proportions of (20-94.5):(5-65):(0.5-15);

with the provisos that: (a) the sum of all the above percentages of (1), (2), and (3) is 100%; and (b) the pendant carboxylic groups of the polymer blend are neutralized with metal ions to a degree of at least 10%.

2. A blend of claim 1 wherein the pendant carboxylic groups are neutralized with metal ions to a degree of at least 50%.

3. A blend of claim 2 wherein component (1) is a copolymer of chloroprene with methacrylic acid wherein methacrylic acid constitutes about 1–5% of the copolymer weight; component (2) is a copolymer of ethylene with methacrylic acid wherein methacrylic acid constitutes about 8–15% of the copolymer weight; and component (3) is a terpolymer of ethylene with vinyl acetate and methacrylic acid, the respective weight proportions of the last-named two comonomers being about 20–30% and 1–5%.

4. A blend of claim 3 wherein component (1) is present in a weight proportion of about 45–65%; component (2) is present in a weight proportion of about 15–30%; and component (3) is present in a weight proportion of about 15–30%.

5. A blend of claim 1 wherein the pendant carboxylic groups of at least one copolymer are derived from at least two different α,β-unsaturated acid comonomers.

6. A blend of claim 1 wherein at least one copolymer contains a small amount of at least one additional ethylenically unsaturated comonomer.

7. A blend of claim 1 wherein the metal ion in $Zn^{+2}$.

8. A blend of claim 1 wherein the metal ion is $Na^{+1}$.

* * * * *